3,385,716
WELD ARRESTING COMPOSITION
George J. Jagaciak, Milford, John W. Poulton, Wallingford, and William L. Cronan, East Haven, Conn., assignors to Olin Mathieson Chemical Corporation, a corporation of Virginia
Filed Jan. 4, 1966, Ser. No. 518,713
6 Claims. (Cl. 106—2)

ABSTRACT OF THE DISCLOSURE

The present disclosure teaches a galvanically neutral weld arresting composition which is an aqueous suspension containing from 5 to 60% by weight titanium dioxide, from 0.5 to 5% by weight bentonite, from 0.10 to 4% by weight magnesium montmorillonite, and the balance essentially water.

---

Figure 1:
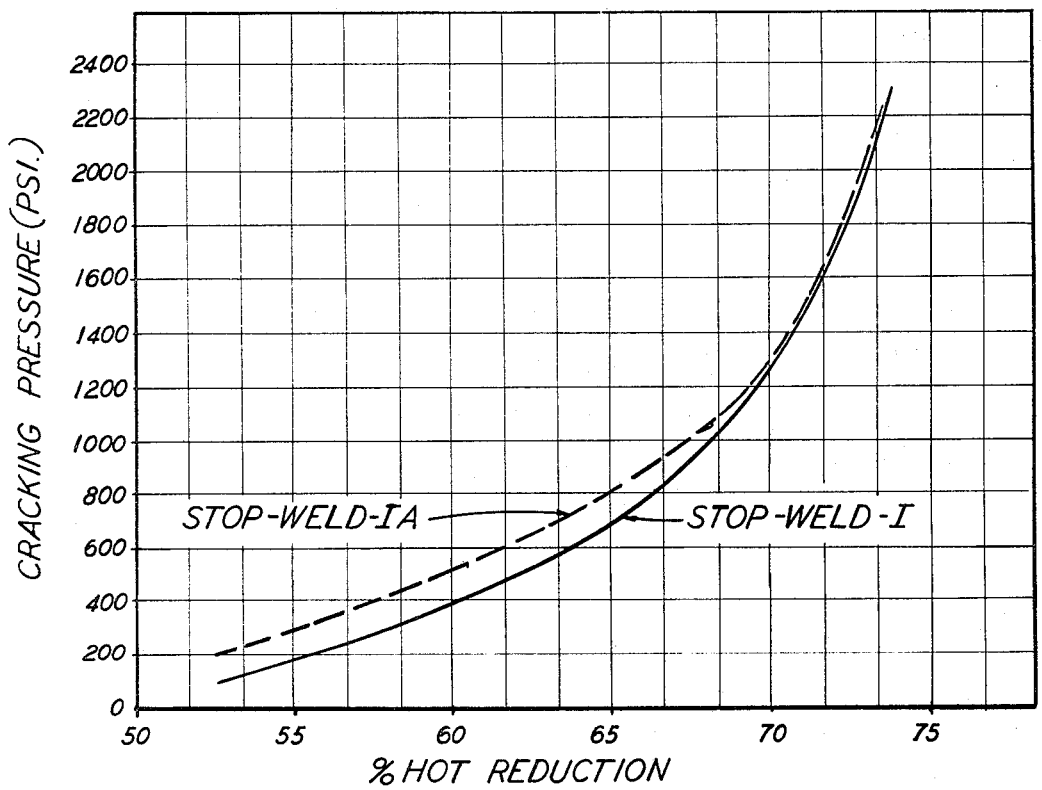
Figure 2:
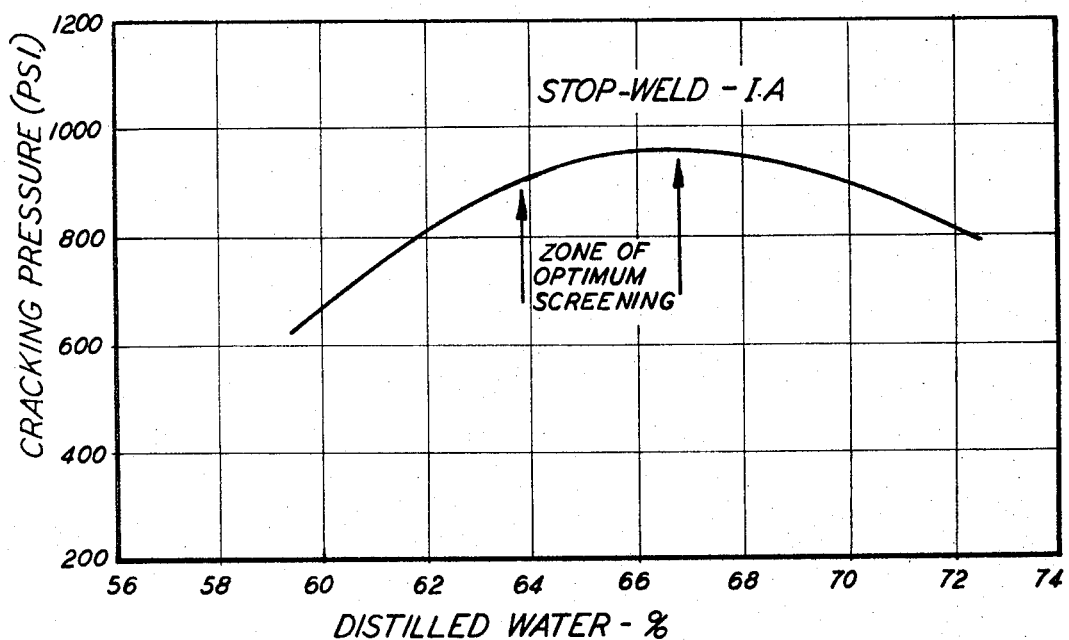
Figure 3:
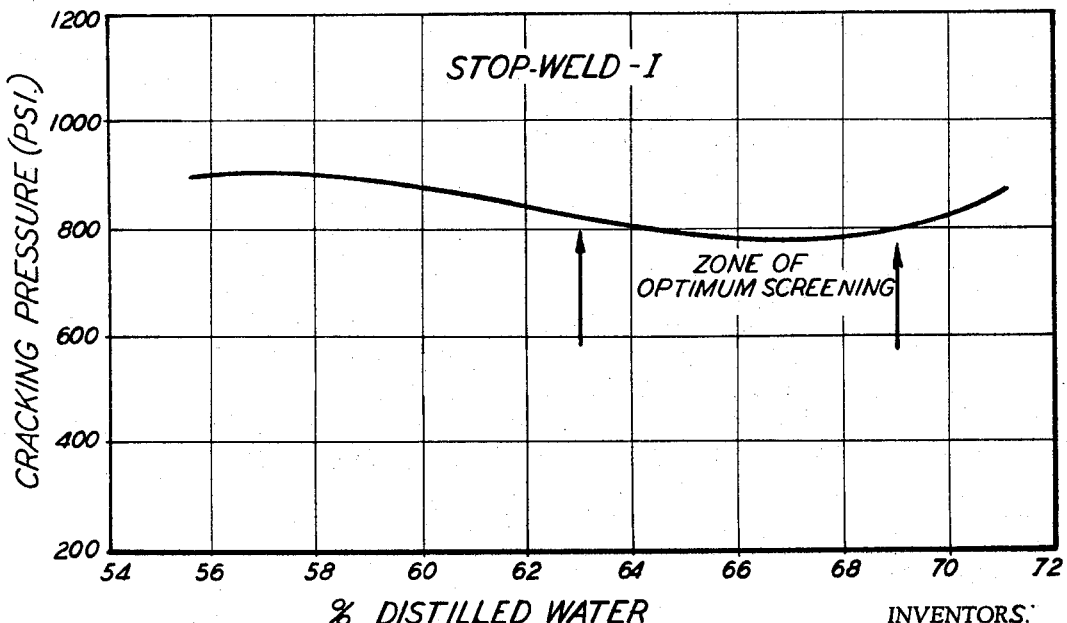

The present invention relates to weld arresting or stop-weld compositions used to create weld-free zones in metal fabricating operations.

During the cold or hot autogenous welding of two metals (pressure or roll welding), subsequent fabrication steps may necessitate the creation of weld-free zones. These weld-free zones are generally formed by interposing between the metals a substance called a weld arrester or stop-weld material.

Following the welding operation, the unwelded parts may be subjected to an internal pressure by the use of a fluid under pressure to move apart the metal adjacent the unwelded or weld-free zones. This procedure permits the convenient fabrication of articles, such as heat exchangers, with the article being characterized as an integral metal sheet containing passages internally thereof.

The commonly used stop-weld material is lamellar graphite. This material is conventionally applied to the surface of the metal in the desired pattern by means of a silk or nylon screening operation. The foregoing operation requires that the stop-weld material possess certain physical properties. The morphology and crystal structure of the material must favor easy extrusion and deposition of the stop-weld through the openings in the silk or nylon screen under the shearing of a manually applied squeegee. In addition, the stop-weld material must have sufficient adherence to the metal so that upon removal of the screen it does not lift up with the screen leaving uncoated metal in the patterned areas.

Furthermore, the layer of stop-weld material must be uniformly deposited, completely cover the desired surface areas, fill corners and produce straight edges where this is required.

Further characteristics of a successful stop-weld material is that the layer of stop-weld deposited on the metal must not spall or crack under low temperature drying conditions. When heated in the furnace at elevated temperatures prior to subsequent bonding and fabrication practices, the stop-weld must not decompose or spall. In addition, a stop-weld must extend under rolling reduction pressure in such a manner that complete pattern coverage is maintained, providing optimum weld arresting at the patterned interface.

As can be recognized, the foregoing represents numerous and severe requirements in a stop-weld material. Graphitic base stop-weld material fulfills all of the foregoing requirements. However, for some uses of the integral material containing weld-free zones, a need exists for a stop-weld or weld arresting material which in addition to the foregoing attributes is galvanically neutral with respect to aluminum, especially in aqueous environments. Graphite is an undesirable element in a weld arresting material from the corrosion standpoint, especially in aqueous environments. Graphite is a strong cathodic depolarizer and under aqueous conditions in the presence of aluminum tends to accelerate the electrochemical processes leading to failure by preferential corrosion pitting. Furthermore, despite special cleaning techniques there is no practical method of removing all traces of graphitic stop-weld from the integral welded material.

Accordingly, it is an object of the present invention to develop a novel weld arresting material.

It is a principal object of the present invention to develop a suitable stop-weld material which satisfies the numerous and severe requirements for an acceptable stop-weld material, and in addition, is galvanically neutral with respect to aluminum, especially in aqueous environments.

It is a further object of the present invention to provide a novel weld arresting material as aforesaid which is relatively inexpensive and readily utilizable on a commercial scale.

Further objects and advantages of the present invention will be apparent from the ensuing discussion.

In accordance with the present invention, it has now been found that the foregoing objects and advantages may be readily attained and a novel weld arresting material provided.

The novel weld arresting material of the present invention comprises an aqueous suspension containing from 5 to 60% by weight of titanium dioxide, from 0.5 to 5.0% by weight of bentonite, from 0.10 to 4% by weight of magnesium montmorillonite, and the balance essentially water. Still further improvements can be obtained by adding in addition to the foregoing from 0.1 to 10% by weight of silicon dioxide.

The titanium dioxide, which is a principal ingredient of the present composition, is used in an amount from 5 to 60% by weight and preferably from 15 to 40% by weight. Preferably a water dispersible titanium dioxide should be used. The titanium dioxide can be dispersed in water to form a paste which can be screened; however, such a mixture is not ideally suited for screening operations because of rapid drying and hence loading of the screen. In addition, stop-weld patterns produced with titanium dioxide-water dispersions alone spall during drying and preheat cycles prior to the bonding operation.

To eliminate this problem, bentonite is dry blended with the titanium dioxide prior to mixing with water. The bentonite is used in an amount from 0.5 to 5% and preferably from 1 to 3%. Bentonite is essentially a hydrophilic material which acts as a filler.

If the stop-weld material contains less than 0.5% bentonite, the stop-weld spalls on drying, especially in heat. If over 5% of bentonite is present, the cracking pressure of the stop-weld increases rapidly, thereby degrading weld-arresting ability.

To further improve the plasticity of the stop-weld mix magnesium montmorillonite is added in an amount from 0.10 to 4% by weight and preferably from 0.25 to 1.5% by weight. This material acts as a gelling agent similar to gelatins and gum materials and yet is inorganic, contains no carbon and is not subject to microbiological degradation. In addition, the magnesium montmorillonite controls the pH stability during storage of the stop-weld paste.

A preferred form of magnesium montmorillonite is "Ben-A-Gel," a trademark of the National Lead Company for a highly beneficiated magnesium montmorillonite.

The magnesium montmorillonite component of the stop-weld of the present invention is preferably prepared in the form of a premixed gel containing the desired amount of magnesium montmorillonite and the balance water mixed in any high shear stirring device. The dry, premixed titanium dioxide-bentonite component may be simply added to the gel or the gel may be mixed with the titanium dioxide-bentonite component in a high shear stirring device. Additional make-up water may be added as desired.

In developing an optimum stop-weld formulation, it has been found that it is difficult to consistently produce uniform batches of material due to the inherent tendency of titanium dioxide to flocculate, especially in dry mixing the ingredients.

In accordance with the present invention, it has been found that by incorporating small amounts of silica, especially colloidal silica, with the dry ingredients a more homogeneous blend is achieved which provides optimum uniformity in the stop-weld performance. In general, 0.10 to 10% by weight of silica is utilized and preferably from 0.1 to 1%.

Naturally, additional additives may be incorporated with the stop-weld of the present invention, for example, talc, boron nitride, kaolin, magnesium oxide, and so forth.

It has been found in addition that the stop-weld material of the present invention should preferably have a viscosity in the range of from 32,000 to 50,000 cps. apparent viscosity at 72° F.

The present invention will be more readily understandable from a consideration of the following illustrative examples.

EXAMPLE I

Stop-weld materials in accordance with the present invention were prepared by dry blending titanium dioxide, bentonite and colloidal silica in the desired amounts, adding magnesium montmorillonite in the desired amount in the form of a water gel, adding the desired make-up water and subjecting the mixture to a high shear stirring device to give the following stop-weld compositions where percentages indicate weight percents.

TABLE I

| | Stop-Weld I | Stop-Well II |
|---|---|---|
| Ingredients, Percent: | | |
| TiO₂ | 31.2 | 33.2 |
| Bentonite | 1.56 | 1.66 |
| Magnesium Montmorillonite | 0.33 | 0.36 |
| SiO₂ | 0.67 | 0.71 |
| Water | Balance | Balance |

The cracking pressures of these stop-weld formulations were determined. The cracking pressure is a criterion for determining weld arresting ability and was determined in the following manner. The panels to be utilized were 1100 aluminum alloy. The panels were degreased and wire brushed. The stop-weld formulation was silk screened in the desired pattern on one of the panels, dried, another panel placed thereover and the assembly spot-welded. The assembly was heated to 950° F., hot rolled 65%, cold rolled 30% and annealed at 650° F. for 20 minutes.

The end of the panel was sheared, an inflation needle was inserted into the stop-weld pattern inlet tube and the panel manually inflated hydraulically at those portions of the panel adjacent the stop-weld pattern.

The initial hydraulic pressure necessary to begin inflation is termed the cracking pressure. The higher the cracking pressure, the lower the weld arresting ability of the stop-weld formulation.

The cracking pressures of the above stop-weld formulations, average of three tests were:

| | P.s.i.g. |
|---|---|
| Stop-weld I | 800 |
| Stop-weld II | 775 |

In addition, both stop-weld formulations were tested and, contrary to graphite, were found to be neutral with respect to aluminum in aqueous environments. In addition, both stop-weld formulations possessed the hereinabove listed favorable attribtues of graphitic stop-welds, e.g., easy extrusion through a silk screen, sufficient adherence to metal, uniform deposition, did not spall, crack or decompose under drying or heating conditions and extends under rolling reduction pressure so that complete pattern coverage is maintained.

EXAMPLE II

This example tests the relationship between cracking pressure and percent hot reduction and also illustrates the beneficial effects of silica addition. The stop-weld materials used were stop-weld I and stop-weld I without silica, designated stop-weld IA.

FIGURE I presents graphically the cracking pressure of both stop-weld I and stop-weld IA. The cracking pressure is related to the percentage of hot rolling reduction at a constant rolling temperature of 950° F.

It is apparent from FIGURE I that both stop-welds I and IA exhibit good cracking pressures. It is further evident from FIGURE I that the addition of colloidal silica effectively reduces the cracking levels of pressures by approximately 100 p.s.i. over the hot rolling reduction range of about 55 to 70%.

EXAMPLE III

This example tests the relationship between cracking pressures and percent water content. The stop-weld materials used were stop-welds I and IA with the procedure of Example I being employed varying the water content. The results of these tests are presented graphically in FIGURE II and FIGURE III. FIGURES II and III show the relationship between cracking pressure and percent water content and also show the zone of optimum screening. The zone of optimum screening is shown by the arrows and indicates the optimum screening because of coverage, pattern fidelity and ease of handling. From FIGURES II and III it is apparent that stop-weld I, the stop-weld containing colloidal silica shown in FGURE III, contributes to the improved uniformity of cracking pressures over the compositional range of the formulation. A comparison of FIGURES II and III also shows the addition of colloidal silica in stop-weld I required lower amounts of water to produce screenable stop-weld material. As a result of this modification the solids content of the stop-weld is higher which effectively contributes to greater uniformity and promotes better coverage and results in lower cracking pressures. In addition, it is clear that in stop-weld I (FIGURE III) the range of optimum screening is widened and cracking pressures are stable over a wide range of water content. This gives the operator greater flexibility in use.

EXAMPLE IV

This example demonstrates the reproducibility and time stability of the stop-welds of the present invention. In this example eight batches of stop-weld I were prepared on eight consecutive days, one batch per day. Each day the cracking pressure was determined for each stop-weld formulation then available in the manner of Example I, i.e., on the first day Batch A was prepared and tested, on the second day Batch B was prepared, and A and B were tested, and so forth. The results are shown in the following table.

TABLE II

| Batch Number | Cracking Pressures On Day Tested, p.s.i.g. | | | | | | | |
|---|---|---|---|---|---|---|---|---|
| | 1 | 2 | 3 | 4 | 5 | 6 | 7 | 8 |
| A | 900 | 700 | 600 | 800 | 650 | 700 | 750 | 800 |
| | 700 | 950 | 700 | 800 | 500 | 750 | 750 | 400 |
| | 850 | 1,000 | 800 | 800 | 900 | 750 | 850 | 650 |
| B | | 900 | 800 | 900 | 750 | 750 | 650 | 600 |
| | | 800 | 750 | 900 | 800 | 800 | 700 | 700 |
| | | 750 | 800 | 850 | 900 | 850 | 750 | 600 |
| C | | | 750 | 700 | 700 | 850 | 1,000 | 700 |
| | | | 800 | 800 | 800 | 850 | 600 | 700 |
| | | | 750 | 900 | 900 | 1,200 | 700 | 650 |
| D | | | | 900 | 900 | 700 | 850 | 700 |
| | | | | 900 | 1,050 | 700 | 850 | 550 |
| | | | | 850 | 800 | 900 | 900 | 700 |
| E | | | | | 1,050 | 850 | 900 | 800 |
| | | | | | 1,000 | 850 | 800 | 750 |
| | | | | | 800 | 850 | 750 | 850 |
| F | | | | | | 800 | 800 | 600 |
| | | | | | | 850 | 800 | 700 |
| | | | | | | 900 | 650 | 700 |
| G | | | | | | | 950 | 650 |
| | | | | | | | 700 | 700 |
| | | | | | | | 700 | 750 |
| H | | | | | | | | 750 |
| | | | | | | | | 800 |
| | | | | | | | | 750 |

The foregoing results clearly show the reproducibility of cracking pressure and time stability over the eight day period.

This invention may be embodied in other forms or carried out in other ways without departing from the spirit or essential characteristics thereof. The present embodiment is therefore to be considered as in all respects illustrative and not restrictive, the scope of the invention being indicated by the appended claims, and all changes which come within the meaning and range of equivalency are intended to be embraced therein.

What is claimed is:

1. A weld arresting composition consisting essentially of an aqueous suspension containing from 5 to 60% by weight titanium dioxide, from 0.5 to 5% by weight bentonite, from 0.10 to 4% by weight magnesium montmorillonite, and the balance essentially water.

2. A composition according to claim 1 containing from 0.1 to 10% by weight silicon dioxide.

3. A composition according to claim 2 wherein said titanium dioxide is present in an amount from 15 to 40%.

4. A composition according to claim 2 wherein said bentonite is present in an amount from 1 to 3%.

5. A composition according to claim 2 wherein said magnesium montmorillonite is present in an amount from 0.25 to 1.5%.

6. A composition according to claim 2 wherein said silicon dioxide is colloidal silica in an amount from 0.1 to 1.0%.

References Cited

UNITED STATES PATENTS 2,610,951  9/1952  Hutchins _____ 252—317
3,149,987  9/1964  Crandall _____ 117—5.5

JAMES A. SEIDLECK, *Primary Examiner.*

ALEXANDER H. BRODMERKEL, *Examiner.*

T. MORRIS, *Assistant Examiner.*